May 20, 1924. 1,494,700
T. NUSSBAUM
CORD SEPARATING TOOL
Filed April 12, 1923
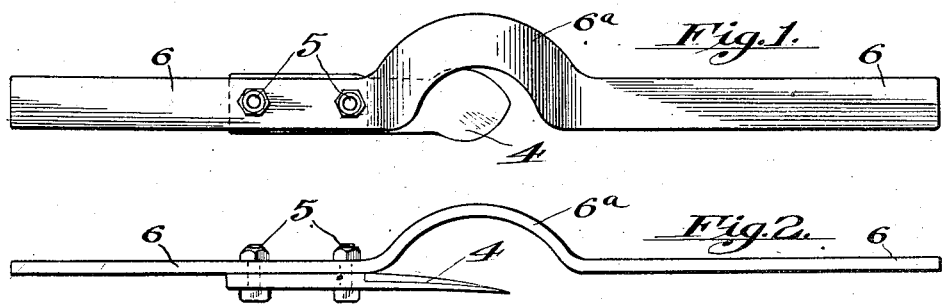
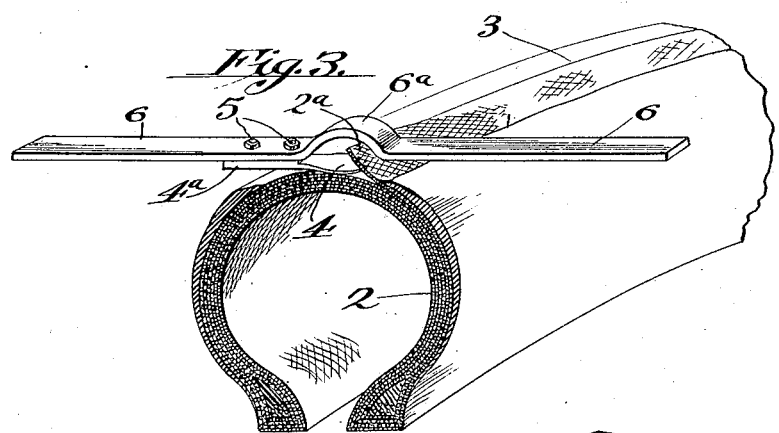
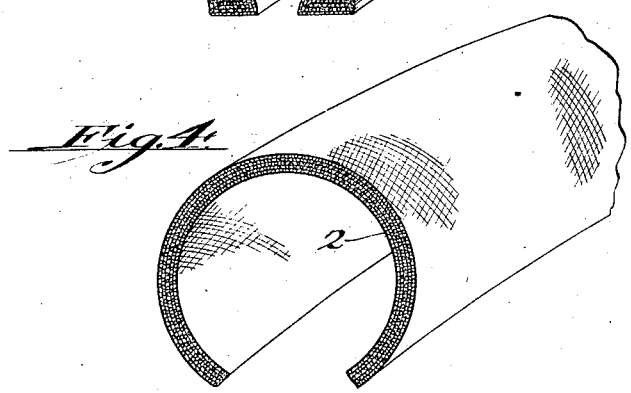
Inventor:
THEODORE NUSSBAUM
By Hazard and Miller
Attorneys.

Patented May 20, 1924.

1,494,700

UNITED STATES PATENT OFFICE.

THEODORE NUSSBAUM, OF BAKERSFIELD, CALIFORNIA.

CORD-SEPARATING TOOL.

Application filed April 12, 1923. Serial No. 631,565.

*To all whom it may concern:*

Be it known that I, THEODORE NUSSBAUM, a citizen of Germany, residing at Bakersfield, in the county of Kern and State of California, have invented new and useful Improvements in Cord-Separating Tools, of which the following is a specification.

This invention relates to hand tools, and more particularly to pneumatic tire slitting tools.

It is an object of the invention to provide means for facilitating the removal of the outer layer or layers of cord fabrics from cord tires for salvage purposes. An object is to provide a tool that may be readily and rapidly applied to and run along the tread face of a tire carcass to start the separation of the outer cord layers from the inner layers.

Other objects and advantages will be made manifest in the following specification of an embodiment of the invention illustrated in the accompanying drawings, wherein—

Figure 1 is a plan of the improved tool.

Fig. 2 is an edge elevation of the tool.

Fig. 3 is a perspective of the tool as applied in the separation of the tire layers.

Fig. 4 is a perspective of the denuded carcass.

In the recovery of the useful, interior carcass of a worn cord tire, the deteriorated tread rubber is first removed so as to fully expose the outer, central portion of the outermost cord layer of fabric forming the cord carcass. Then the outer layer is ordinarily circumferentially split around the tire. The outermost layer or layers of the cord carcass, when removed, leave the laminated layers of the carcass of the tire, and this carcass has salvage uses in the making of inside boots and inner liners.

The broad purpose of my present invention is to provide a tool which will quickly separate or split the outer layer or layers of cord fabric from the subjacent layers to facilitate the skinning off of these layers. By my tool, a very material saving of time is accomplished, as I have demonstrated by actual use of the tool.

In Figure 3, the tool is shown as applied to a carcass of cord layers 2, the outermost rubber covered layer of which is to be removed. In this process, the outermost layer is split circumferentially as along the line 3, to facilitate the introduction of a splitting blade 4, which may be thrust transversely in under the outer layer 2ª being removed.

The tool 4 is substantially in the form of a tongue with a rounded, effective end, and sufficiently sharpened edge to facilitate penetration between cord fabrics without cutting the same.

The tool 4 has a shank 4ª which is detachably fastened by bolts 5 or otherwise, to a handle bar including grip portions 6, and an intermediate arched portion 6ª, which springs upwardly above the exposed entering end of the tool or blade 4 so as to permit this to pass in under a layer of fabric which will be raised up below the arch 6ª of the drawing handle. The arch 6ª also bows laterally as to the length of the handle, and thus exposes the effective end of the blade 4 so as to render it clearly observable for ready and proper application under the split fabric.

It will be seen that after the outer layer or layers which it is desired to remove from the cord carcass has or have been circumferentially split, the operator simply inserts the tool 4 beneath the edges of the split fabrics and thrusts the tool transversely under the fabric a suitable distance and then draws the blade circumferentially along the tire, with the result that the split layers will be lifted or separated from the subjacent layers. After having been so separated from the inner layers, the partially separated layers can be skinned off with a quick action without the unravelling or working out of the warp and weft of the layer or layers.

Further embodiments, modifications and variations may be resorted to within the principle of the invention.

What is claimed is:

1. A tool for facilitating the removal of split cord or fabric layers from tire carcasses, including a drawing handle and a blade having one end spaced below a portion of the handle and adapted to be thrust laterally between layers of the carcass and drawn along around the tire to separate the split layers from the carcass.

2. A tool for facilitating the removal of split cord or fabric layers from tire carcasses, including a drawing handle and a blade having one end spaced below a portion of the handle and adapted to be thrust laterally between layers of the carcass and drawn along around the tire to separate the split layers from the carcass, the drawing handle of the tool having an upwardly curved portion below which the blade of the tool projects.

3. A tool for facilitating the removal of split cord or fabric layers from tire carcasses, including a drawing handle and a blade having a cutting end spaced below a portion of the handle and adapted to be thrust laterally between the layers of the carcass and drawn along around the tire to separate the split layers from the carcass, the drawing handle having a forwardly and upwardly bowed intermediate portion beneath which the blade projects.

In testimony whereof I have signed my name to this specification.

THEODORE NUSSBAUM.